(12) United States Patent
Kowalski et al.

(10) Patent No.: US 7,961,587 B2
(45) Date of Patent: Jun. 14, 2011

(54) SYSTEMS AND METHODS FOR REDUCING PEAK TO AVERAGE CROSS-CORRELATION FOR SEQUENCES DESIGNED BY ALTERNATING PROJECTIONS

(75) Inventors: John M. Kowalski, Camas, WA (US); Huaming Wu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1008 days.

(21) Appl. No.: 11/775,101

(22) Filed: Jul. 9, 2007

(65) Prior Publication Data

US 2008/0232235 A1 Sep. 25, 2008

Related U.S. Application Data

(60) Provisional application No. 60/895,658, filed on Mar. 19, 2007.

(51) Int. Cl.
*H04J 11/00* (2006.01)
(52) U.S. Cl. ......... 370/203; 370/208; 370/209; 370/210
(58) Field of Classification Search .................. None
See application file for complete search history.

(56) References Cited

U.S. PATENT DOCUMENTS

| | | |
|---|---|---|
| 7,145,940 B2 | 12/2006 | Gore et al. |
| 7,170,926 B2 | 1/2007 | Zeira |
| 7,173,899 B1 | 2/2007 | Rupp |
| 7,173,973 B2 | 2/2007 | Borran et al. |
| 7,633,923 B2 * | 12/2009 | Gorokhov et al. ............ 370/343 |
| 2007/0217530 A1 * | 9/2007 | Hosseinian et al. .......... 375/260 |
| 2009/0285332 A1 * | 11/2009 | Damen et al. ................. 375/299 |

FOREIGN PATENT DOCUMENTS

| | | |
|---|---|---|
| EP | 1898542 | 3/2008 |
| JP | 2007-89113 | 4/2007 |
| WO | 2006/134949 | 12/2006 |

OTHER PUBLICATIONS

Tropp et al., "Designing Tight Frames via an Alternating Projection Method," IEEE Transactions on Information Theory, vol. 51, No. 1, Jan. 2005, pp. 188-209.*
3GPP RAN1 submission R1-071494, "Optimized UL RS Design, and some issues with current UL proposals," Sharp, Mar. 2007.
J. Coon et al., "Optimal Training Sequences for Channel Estimation in Cyclic-Prefix-Based Single-Carrier Systems with Transmit Diversity," IEEE Signal Processing Letters, vol. 11, No. 9, Sep. 2004, pp. 729-732.

(Continued)

*Primary Examiner* — Ayaz R Sheikh
*Assistant Examiner* — Faiyazkhan Ghafoerkhan
(74) *Attorney, Agent, or Firm* — Austin Rapp & Hardman

(57) ABSTRACT

A method for using a numerical method to design reference signals for multiple input multiple output (MIMO) systems is described. An input multiple input multiple output signal is determined. A nearest tight frame to one or more given structured vectors is obtained. One or more structured vectors from the nearest tight frame are obtained. Orthogonal subsets are computed for a plurality of sequences, wherein each of the subsets is replaced with a matrix that comprises a function of one or more elements in each of the plurality of sequences and an identity matrix associated with the one or more elements. The one or more structured vectors are projected onto the space of circulant matrices. One or more classes of matrices associated with reference signals are outputted.

25 Claims, 10 Drawing Sheets

OTHER PUBLICATIONS

L.R. Welch, "Lower Bounds on the Maximum Cross-Correlation of Signals," IEEE Transactions on Information Theory, vol. IT-20, No. 3, May 1974, pp. 397-399.

B. Popovic, "Generalized Chirp-Like Polyphase Sequences with Optimum Correlation Properties," IEEE Transactions on Information Theory, vol. 38, No. 4, Jul. 1992, pp. 1406-1409.

Tropp et al., "Designing Tight Frames via an Alternating Projection Method," IEEE Transactions on Information Theory, vol. 51, No. 1, Jan. 2005, pp. 188-209.

S. Boyd and L. Vandenberghe, "Convex Optimization", Cambridge, University Press, 2004, p. 634.

R.M. Gray, Toeplitz and Circulant Matrices: a Review, http://ee.stanford.edu/~gray/toeplitz.pdf, Jun. 28, 2007.

3GPP RAN1 submission R1-070152, Uplink Reference Signal Generation Methods Motorola, Jan. 2007.

3GPP RAN1 submission R1-070877, Citeria to decide Zadoff-Chu sequence length for EUTRA uplink reference signal, NEC, Feb. 2007.

* cited by examiner

US 7,961,587 B2

SYSTEMS AND METHODS FOR REDUCING PEAK TO AVERAGE CROSS-CORRELATION FOR SEQUENCES DESIGNED BY ALTERNATING PROJECTIONS

RELATED APPLICATIONS

This application is related to and claims priority from U.S. Provisional Patent Application Ser. No. 60/895,658 filed Mar. 19, 2007, for SYSTEMS AND METHODS FOR REDUCING PEAK TO AVERAGE CROSS-CORRELATION FOR SEQUENCES DESIGNED BY ALTERNATING PROJECTIONS, with inventor John M. Kowalski and Huaming Wu, which is incorporated herein by reference.

TECHNICAL FIELD

The present invention relates generally to wireless communications and wireless communications-related technology. More specifically, the present invention relates to systems and methods that reduce peak to average cross-correlation for sequences designed by alternating projections.

BACKGROUND

A wireless communication system typically includes a base station in wireless communication with a plurality of user devices (which may also be referred to as mobile stations, subscriber units, access terminals, etc.). The base station transmits data to the user devices over a radio frequency (RF) communication channel. The term "downlink" refers to transmission from a base station to a user device, while the term "uplink" refers to transmission from a user device to a base station.

Orthogonal frequency division multiplexing (OFDM) is a modulation and multiple-access technique whereby the transmission band of a communication channel is divided into a number of equally spaced sub-bands. A sub-carrier carrying a portion of the user information is transmitted in each sub-band, and every sub-carrier is orthogonal with every other sub-carrier. Sub-carriers are sometimes referred to as "tones." OFDM enables the creation of a very flexible system architecture that can be used efficiently for a wide range of services, including voice and data. OFDM is sometimes referred to as discrete multi-tone transmission (DMT).

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering OFDM as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), Orthogonal Frequency-Division Multiplexing (OFDM)) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more mobile stations and one or more base stations that each transmit a reference signal. Reference signals may be designed such that an unacceptable peak cross-correlation between reference signals exists. As such, benefits may be realized from systems and methods that improve the design of reference signals for spatially multiplexed cellular systems. In particular, benefits may be realized from systems and methods that reduce peak to average cross-correlation for sequences designed by alternating projections.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
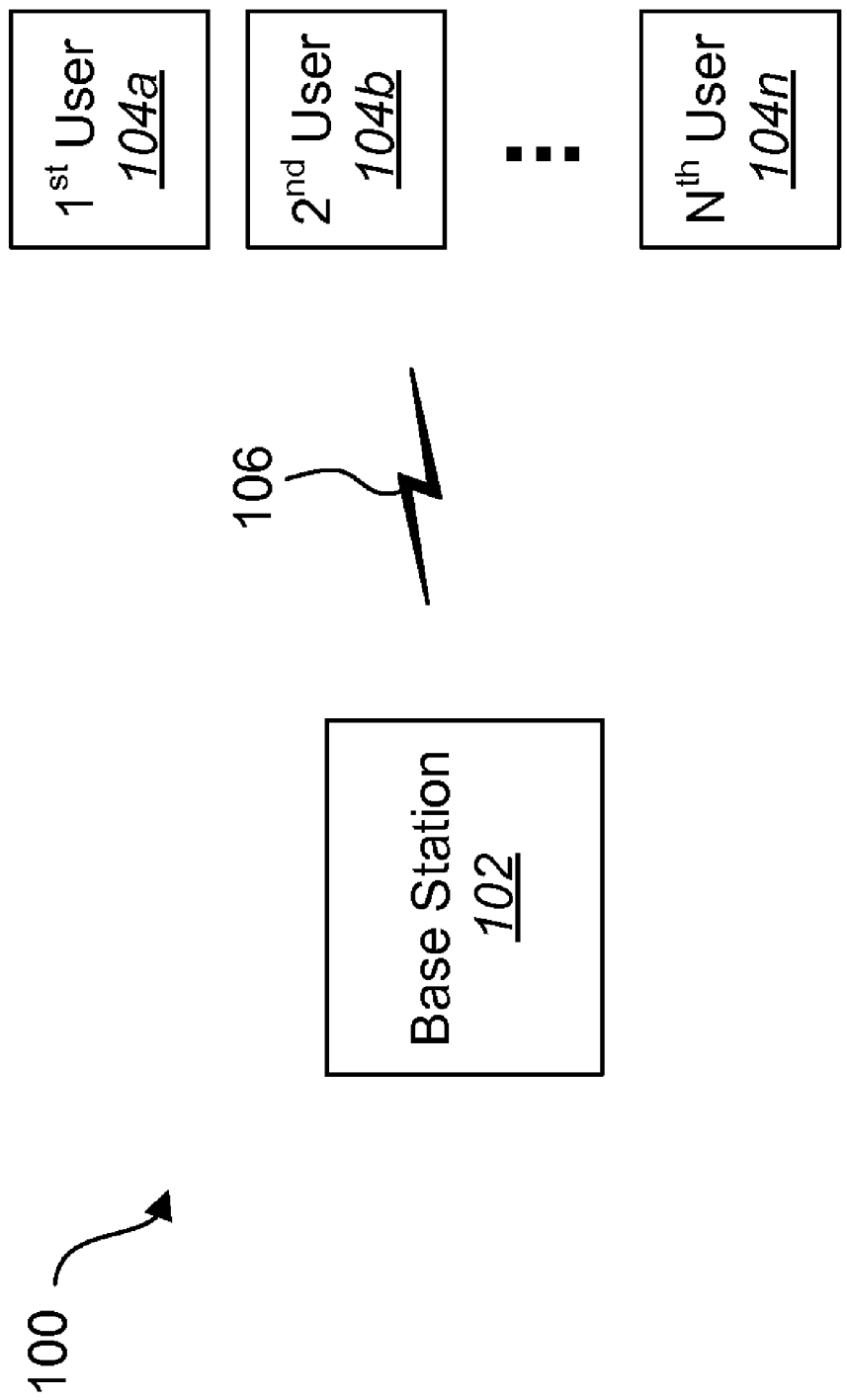
FIG. 1 illustrates an exemplary wireless communication system in which embodiments may be practiced.

A method for using a numerical method to design reference signals for multiple input multiple output (MIMO) systems is described. An input multiple input multiple output signal is determined. A nearest tight frame to one or more given structured vectors is obtained. One or more structured vectors from the nearest tight frame are obtained. Orthogonal subsets are computed for a plurality of sequences, wherein each of the subsets is replaced with a matrix that comprises a function of one or more elements in each of the plurality of sequences and an identity matrix associated with the one or more elements. The one or more structured vectors are projected onto the space of circulant matrices. One or more classes of matrices associated with reference signals are outputted.

In one embodiment, a set of reference signals is provided to cover three sectors of a cell. At least two reference signals per sector may be provided. The set of reference signals may be orthogonal in each sector of a given cell. The set of reference signals is orthogonal in sectors adjacent to a given cell. In one embodiment, reference signals not in adjacent sectors are minimally correlated. The set of reference signals may include a Peak to Average Power Ratio that approximates the value of one. Multiple bandwidths may be employed simultaneously. A set of sequences may be recursively generated from a base sequence.

A matrix on the unit hyper-sphere with non-zero components may be provided. The correlation between each of the one or more structured vectors may be outputted. A sequence set may be projected to a nearest tight frame. Subsets of a nearest tight frame may be projected to one or more orthogonal matrices. One or more orthogonal matrices may be projected to a nearest circulant matrix. Each sequence may be projected onto a minimum Peak to Average Power Ratio vector. The matrix may equal $(\beta I_d + (1-\beta))(X_i \, X_i^H)^{1/2} \, X_i$, wherein d comprises the number of elements in any given sequence, $I_d$ comprises a d×d identity matrix, and $0 \leq \beta \leq 1$.

A transmitter that is configured to use a numerical method to design reference signals for multiple input multiple output (MIMO) systems is also described. The transmitter includes a processor and memory in electronic communication with the processor. Instructions are stored in the memory. An input multiple input multiple output signal is determined. A nearest tight frame to one or more given structured vectors is obtained. One or more structured vectors from the nearest tight frame are obtained. Orthogonal subsets are computed for a plurality of sequences, wherein each of the subsets is replaced with a matrix that comprises a function of one or more elements in each of the plurality of sequences and an identity matrix associated with the one or more elements. The one or more structured vectors are projected onto the space of circulant matrices. One or more classes of matrices associated with reference signals are outputted.

A computer-readable medium comprising executable instructions for using a numerical method to design reference signals for multiple input multiple output (MIMO) systems is also described. An input multiple input multiple output signal is determined. A nearest tight frame to one or more given structured vectors is obtained. One or more structured vectors from the nearest tight frame are obtained. Orthogonal subsets are computed for a plurality of sequences, wherein each of the subsets is replaced with a matrix that comprises a function of one or more elements in each of the plurality of sequences and an identity matrix associated with the one or more elements. The one or more structured vectors are projected onto the space of circulant matrices. One or more classes of matrices associated with reference signals are outputted.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Reference signals may be used in communication systems. Reference signals may include a single frequency and are transmitted over the communication systems for supervisory, control, equalization, continuity, synchronization, etc. Communication systems may include one or more mobile stations and one or more base stations that each transmit a reference signal. Reference signals may be designed such that a mobile station may re-use a reference signal that was previously used by a different mobile station or is used at the same time at another mobile station in another cell far enough apart so as to negligibly interfere. Truncation or cyclic extension of a particular set of Zadoff-Chu sequences has been utilized to design reference signals for re-use. However, truncation or cyclic extension may result in a tedious integer programming problem for a sequence assignment. In addition, a guarantee of minimal correlation does not exist when truncation or cyclic extension of a particular set of Zadoff-Chu sequences are implemented. Further, because of variable correlation properties of candidate proposed reference signals, detailed planning regarding the mobile station may be done which may be particularly vexing if adjacent networks exist in the same band that are operated by different operators. In addition, the designed reference signal sequences may include an unacceptable peak cross-correlation.

The present systems and methods design reference signals for multiple input multiple output (MIMO) systems in which reference signals are allocated amongst one or more mobile stations, for use in single user or multiple user MIMO systems. In one embodiment, the present systems and methods design uplink reference signals in a cellular system. Communications from mobile stations to base stations may be classified as "uplink" communications. Conversely, communications from base stations to mobile stations may be classified as "downlink" communications. Transmitting uplink reference signals in a cellular system may pose stringent requirements on time and frequency resources on the mobile station. These stringent requirements may impede an optimum design of the reference signals for the mobile station, which may desire to implement a single or multiple carrier modulation with cyclic prefix, where there is synchronization between the transmission of multiple uplink signals and their respective base stations and where sectorization amongst cells of mobile stations is employed to maximize the capacity per cell. In addition, the present systems and methods employ multiple bandwidth allocations simultaneously to multiple base stations. In one embodiment, each bandwidth segment allocated to a mobile station is an integer amount of some basic unit.

In designing a set of reference signals, certain design considerations may be implemented. For example, the set may be large enough to cover at least three sectors per cell, with at least two reference signals per sector. In one embodiment, four reference signals per sector are present. A further design consideration may be that the set of reference signals may be orthogonal in each sector of a given cell. The set of reference signals may also be orthogonal in all sectors adjacent to a given sector. If the reference signals are orthogonal and the reference signals are known to adjacent sectors, a best minimum mean square receiver may be designed and implemented.

For those reference signals that are not in adjacent sectors, or which are not orthogonal, another design consideration may be that these reference signal are minimally correlated, with approximately the same correlation, and approach (if not meet) the Welch Bound. Sets of sequences that approach or meet the Welch Bound may denote a tight frame, where each vector possesses a unit norm, i.e., $\|\chi\eta\|_2=1$. A further design consideration is the set of reference signals may also have a Peak to Average Power Ratio (PAPR) that approaches (if not equal) to 1. The PAPR may be defined as, for a sequence vector c as:

$$\mathcal{P} = \frac{\|c\|_\infty^2}{c^H c}, \qquad \text{(Equation 1)}$$

where $\|c\|_\infty^2$ denotes the square maximum modulus component of c and where $(\ )^H$ denotes a conjugate transpose.

Another example of a design consideration may be that amongst subsets of sequences with orthogonal elements, each element may be a cyclic shift of another element. This property may be useful to provide robust performance if a transmission system which transmits a cyclic prefix for multipath elimination encounters multipath components with a delay spread greater than the cyclic prefix length. An additional design consideration is that in a system where multiple bandwidths are employed simultaneously, the set of reference signal sequences may be recursively generated from a base sequence.

In one embodiment, the amount of reference signal space (time and frequency resources) may be exactly large enough. For example, the basic unit of bandwidth allocation may allow for 19 or any larger prime number of reference signals available for two reference signals per sector. In a further example, the basic unit of bandwidth allocation may allow for 37 or any larger prime number of reference signals for four reference signals per sector. As in this case, if the amount of reference signal space is exactly large enough, Zadoff-Chu sequences may be taken as the reference sequences as they meet the design considerations previously described. However, such resource availability or sequence numerology may not be plausible. An algorithm may be implemented for designing reference signals based on alternating projections. The algorithm may include a series of linear transformation that result in reference signal sequences that are nearest in Euclidean space to a "tight frame," (a set of minimally correlation sequences) as well as transformations that result in orthogonal subsets of sequences and cyclic shifts of sequences. However, the transformation that results in orthogonal subsets of sequences may often create sets of sequences that have highly correlation sequences, despite the overall minimization of mean cross-correlation. For example, previous systems and methods provide that subsets of a sequence $X_i$, should be replaced with $Y_i=(X_i X_i^H)^{1/2} X_i$. However, this transformation may unduly increase the maximum cross-correlation of sequences. In other words, $Y_i^H Y_j$ may have elements whose magnitude is greater than ½ and close to unity The present systems and methods reduce peak to average cross-correlation for sequences designed by alternating projections.

FIG. 1 illustrates an exemplary wireless communication system 100 in which embodiments may be practiced. A base station 102 is in wireless communication with a plurality of user devices 104 (which may also be referred to as mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "OFDM transmitter" refers to any component or device that transmits OFDM signals. An OFDM transmitter may be implemented in a base station 102 that transmits OFDM signals to one or more user devices 104. Alternatively, an OFDM transmitter may be implemented in a user device 104 that transmits OFDM signals to one or more base stations 102.

The term "OFDM receiver" refers to any component or device that receives OFDM signals. An OFDM receiver may be implemented in a user device 104 that receives OFDM signals from one or more base stations 102. Alternatively, an OFDM receiver may be implemented in a base station 102 that receives OFDM signals from one or more user devices 104.

Figure 2:
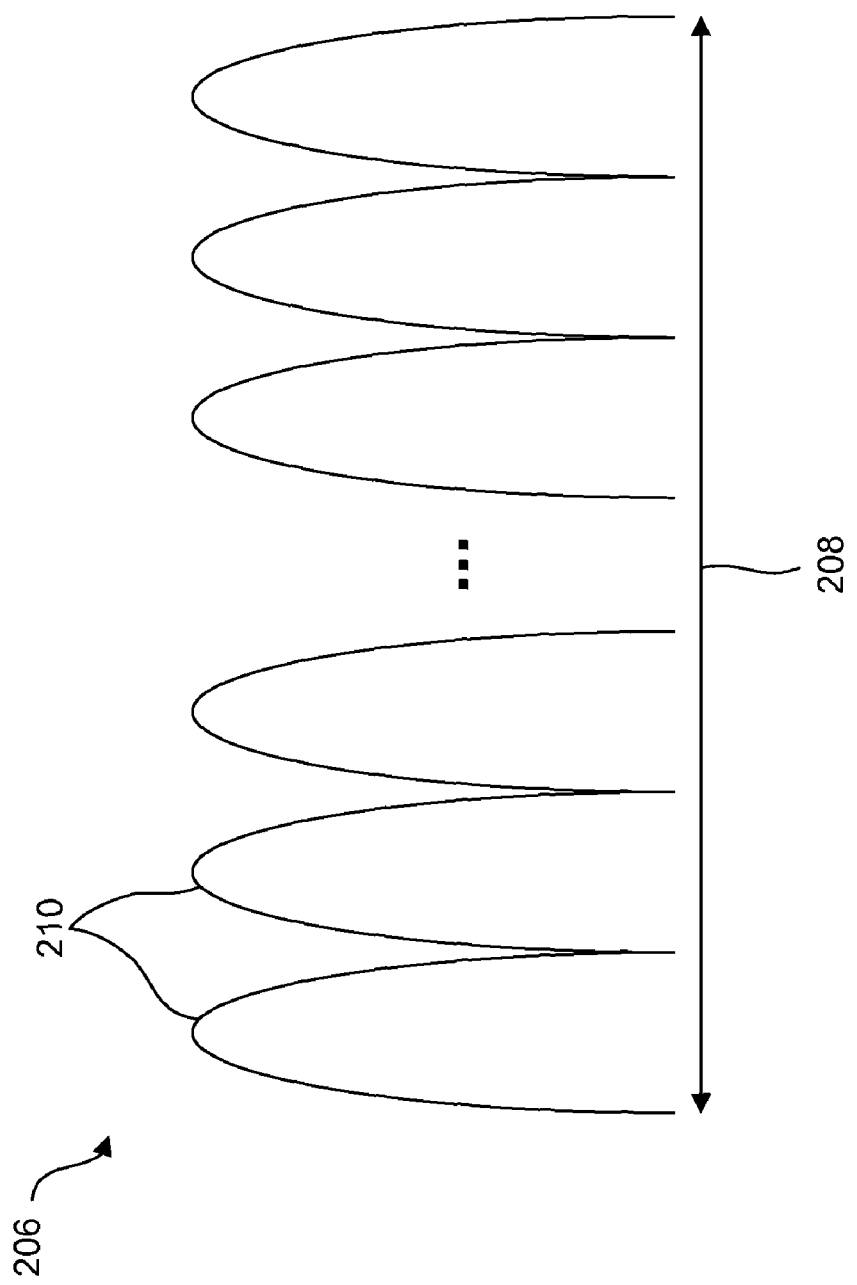
FIG. 2 illustrates some characteristics of a transmission band of an RF communication channel in accordance with an OFDM-based system.

FIG. 2 illustrates some characteristics of a transmission band 208 of an RF communication channel 206 in accordance with an OFDM-based system. As shown, the transmission band 208 may be divided into a number of equally spaced sub-bands 210. As mentioned above, a sub-carrier carrying a portion of the user information is transmitted in each sub-band 210, and every sub-carrier is orthogonal with every other sub-carrier.

Figure 3:
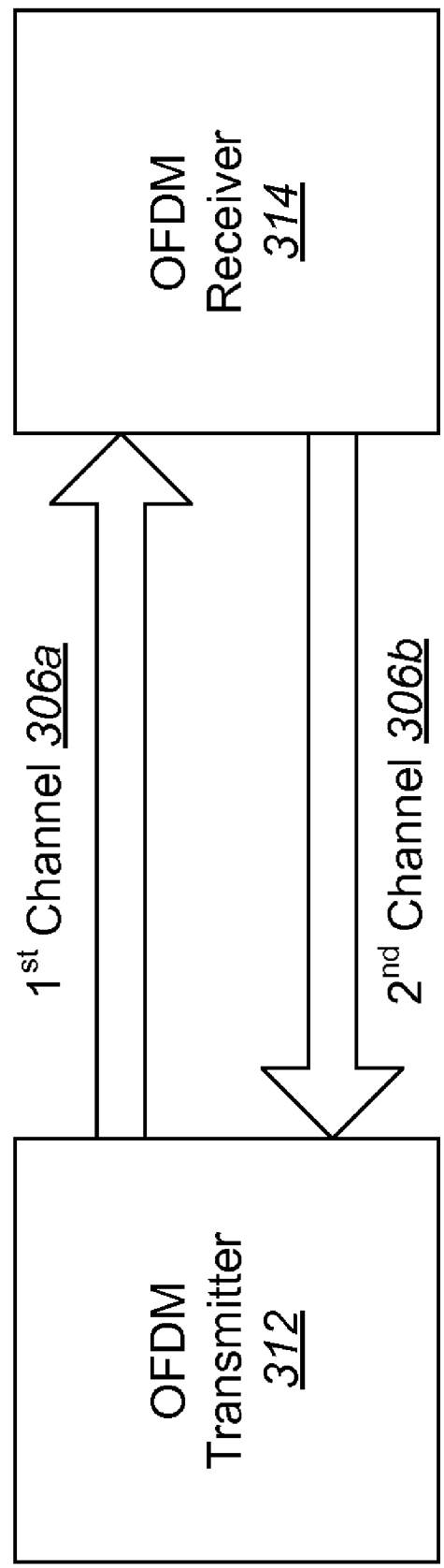
FIG. 3 illustrates communication channels that may exist between an OFDM transmitter and an OFDM receiver according to an embodiment.

FIG. 3 illustrates communication channels 306 that may exist between an OFDM transmitter 312 and an OFDM receiver 314 according to an embodiment. As shown, communication from the OFDM transmitter 312 to the OFDM receiver 314 may occur over a first communication channel 306a. Communication from the OFDM receiver 314 to the OFDM transmitter 312 may occur over a second communication channel 306b.

The first communication channel 306a and the second communication channel 306b may be separate communication channels 306. For example, there may be no overlap between the transmission band of the first communication channel 306a and the transmission band of the second communication channel 306b.

In addition, the present systems and methods may be implemented with any modulation that utilizes multiple antennas/MIMO transmissions. For example, the present systems and methods may be implemented for MIMO Code Division Multiple Access (CDMA) systems or Time Division Multiple Access (TDMA) systems.

Figure 4:
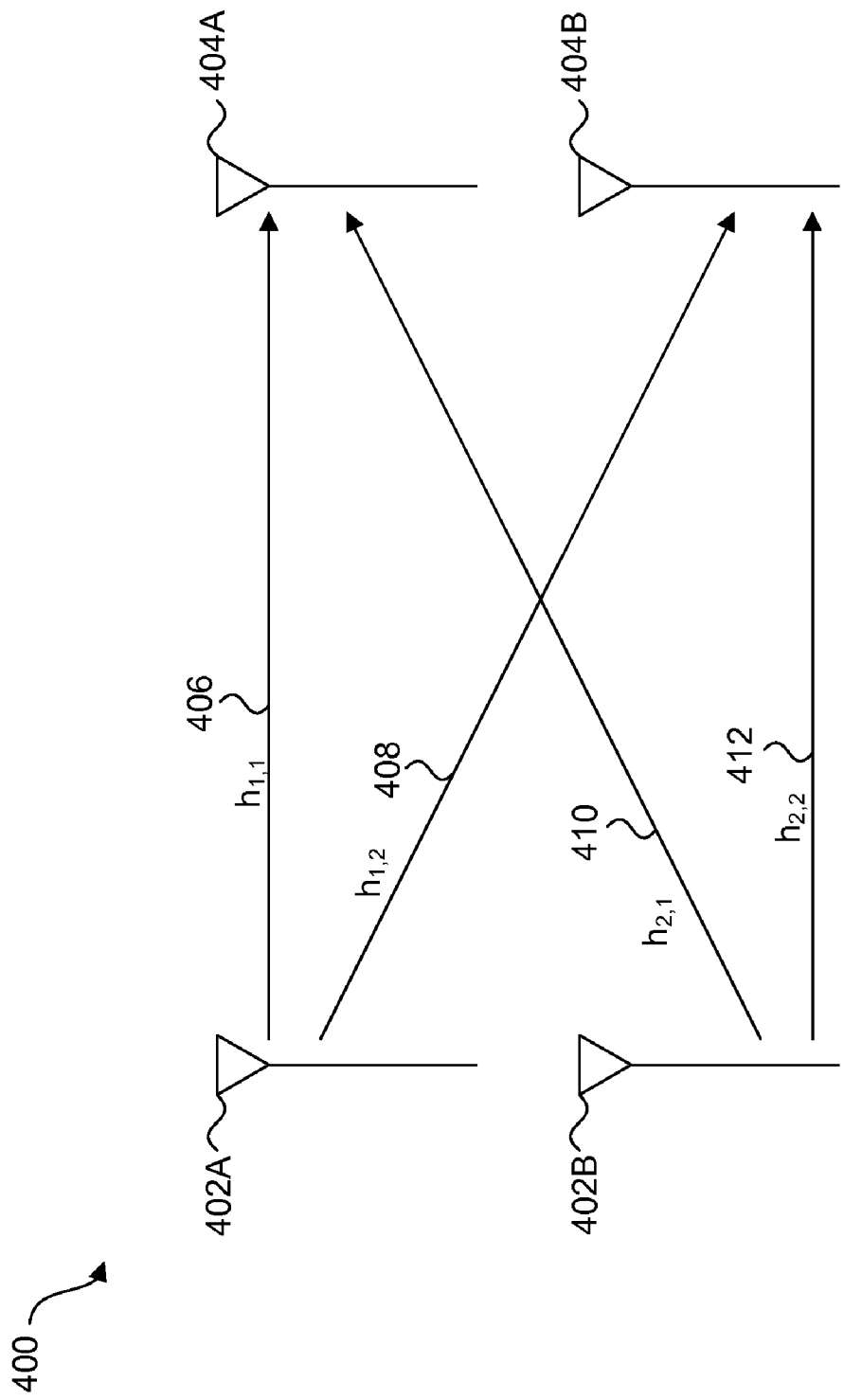
FIG. 4 illustrates one embodiment of a MIMO system that may be implemented with the present systems and methods.

FIG. 4 illustrates one embodiment of a MIMO system 400 that may be implemented with the present systems and methods. The illustrated MIMO system 400 includes a first transmit antenna (Tx$_1$) 402A and a second transmit antenna (Tx$_2$) 402B. The system 400 also includes a first receive antenna (Rx$_1$) 404A and a second receive antenna (Rx$_2$) 404B. The transmit antennas 402A, 402B may be used to transmit a signal 406, 408, 410, 412 to the receive antennas 404A, 404B.

In single antenna systems, multi-path propagation may be detrimental to the performance of the system. The multiple propagation paths may cause "copies" of a signal to arrive at a receiver at slightly different times. These time delayed signals may then become interference when trying to recover the signal of interest. The MIMO system 400 is designed to exploit the multi-path propagation to obtain a performance improvement. For example, the first receive antenna (Rx$_1$) 404A may receive a mixture of a first signal 406 and a third signal 410 which are sent from the first transmit antenna (Tx$_1$) 402A and the second transmit antenna (Tx$_2$) 402B. The first and third signals 406, 410 may be sent over a first channel $h_{1,1}$ and a second third channel $h_{2,1}$. The proportion of the first and third signals that is received at the first receive antenna (Rx$_1$) 404A depends on the transmission channels $h_{1,1}$, $h_{2,1}$. A simplified equation for the signal received at the first receive antenna (Rx$_1$) 404A may be:

$$Rx_1 = (h_{1,1} \times Tx_1) + (h_{2,1} \times Tx_2) \quad \text{(Equation 2)}$$

The first receive antenna (Rx$_1$) 404A receives a combination of what was transmitted from the first and second transmit antennas 402A, 402B. The MIMO system 400 may implement various coding schemes that define which signals 406, 408, 410, 412 should be transmitted, and at what times, to enable an original signal to be recovered when it is received in combination with another signal. These coding schemes may be known as "space-time" codes because they define a code across space (antennas) and time (symbols).

Figure 5:
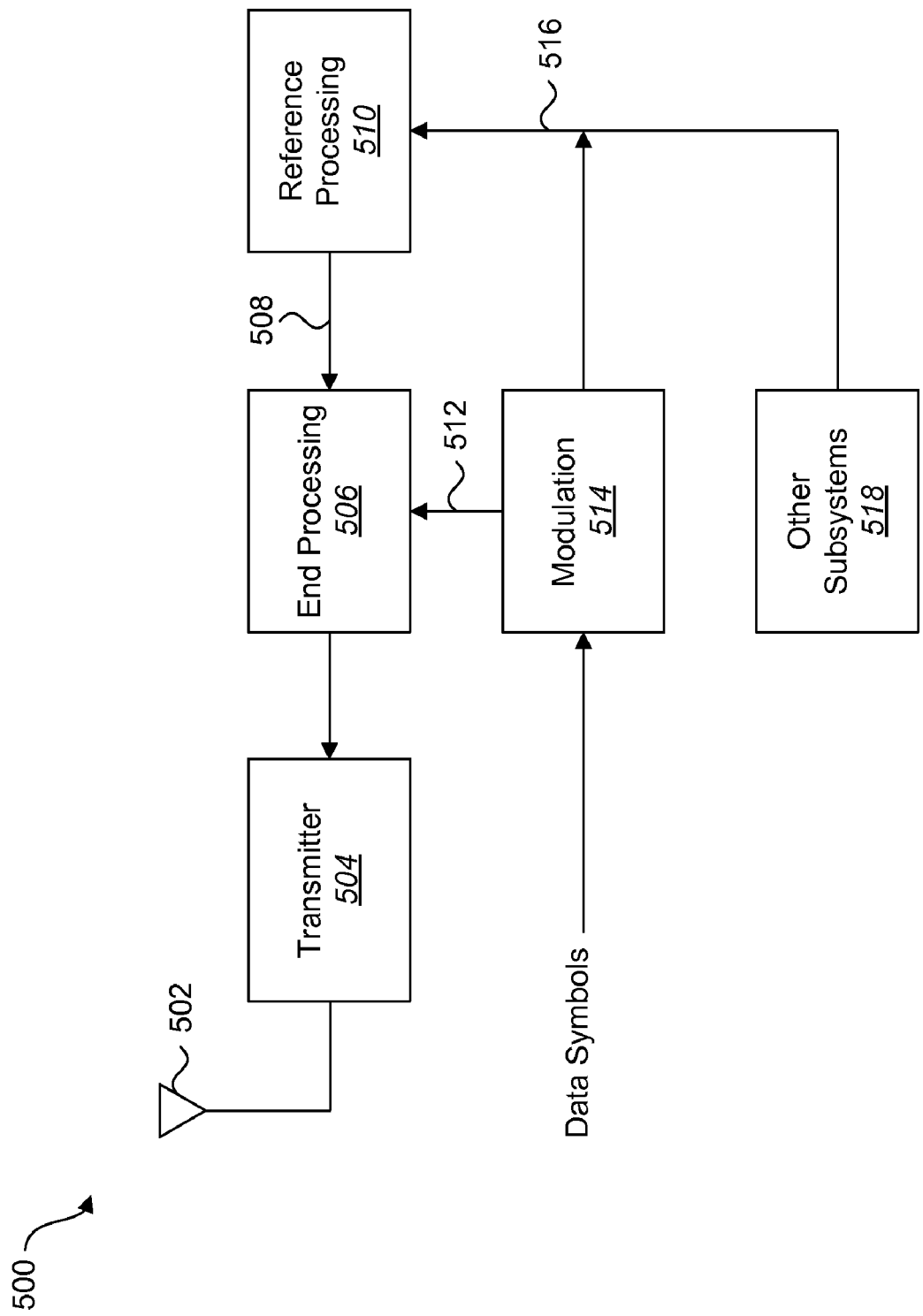
FIG. 5 illustrates a block diagram of certain components in an embodiment of a transmitter.

FIG. 5 illustrates a block diagram 500 of certain components in an embodiment of a transmitter 504. Other components that are typically included in the transmitter 504 may not be illustrated for the purpose of focusing on the novel features of the embodiments herein.

Data symbols may be modulated by a modulation component 514. The modulated data symbols may be analyzed by other subsystems 518. The analyzed data symbols 516 may be provided to a reference processing component 510. The reference processing component 510 may generate a reference signal that may be transmitted with the data symbols. The modulated data symbols 512 and the reference signal 508 may be communicated to an end processing component 506. The end processing component 506 may combine the reference signal 508 and the modulated data symbols 512 into a signal. The transmitter 504 may receive the signal and transmit the signal to a receiver through an antenna 502.

Figure 6:
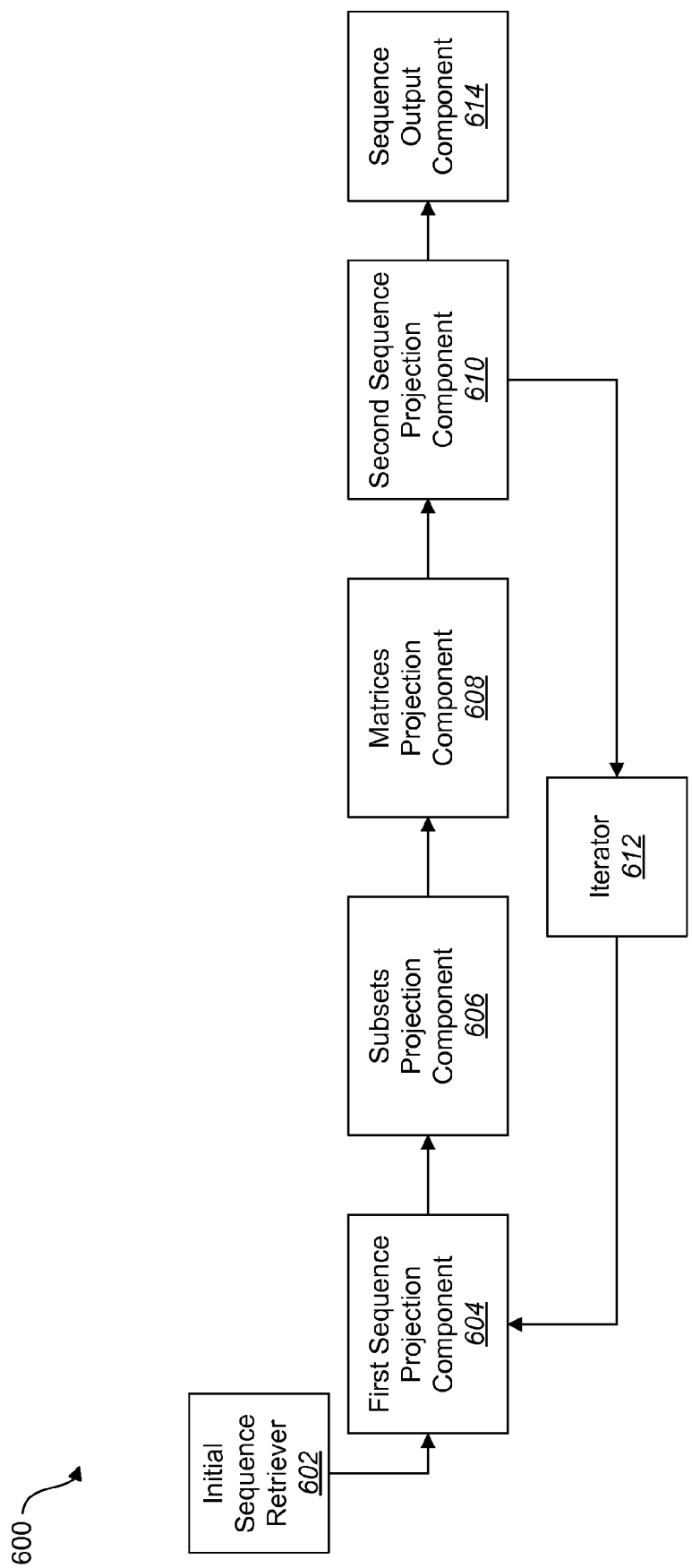
FIG. 6 is a block diagram illustrating one embodiment of components used to design a reference signal to be transmitted in a MIMO system.

FIG. 6 is a block diagram 600 illustrating one embodiment of components used to design a reference signal to be transmitted in a MIMO system. In one embodiment, an initial sequence retriever 602 may obtain initial sequences. A first sequence projection component 604 may project an obtained sequence set to a nearest tight frame. A subsets projection component 606 may be implemented to project subsets of the nearest tight frame to one or more orthogonal matrices. In one embodiment, a matrices projection component 608 may project the one or more orthogonal matrices to a nearest circulant matrix. In one embodiment, a second sequence projection component 610 may project each of the obtained sequence sets onto a minimum Peak to Average Power Ratio (PAPR) vector. An iterator 612 may be utilized to iterate the steps performed by the first sequence projection component 604, the subsets projection component 606, the matrices projection component 608 and the second sequence projection component 610. The iterator 612 may iterate these steps T times. A sequence output component 614 may output the sequences after T iterations have been executed.

Figure 7:
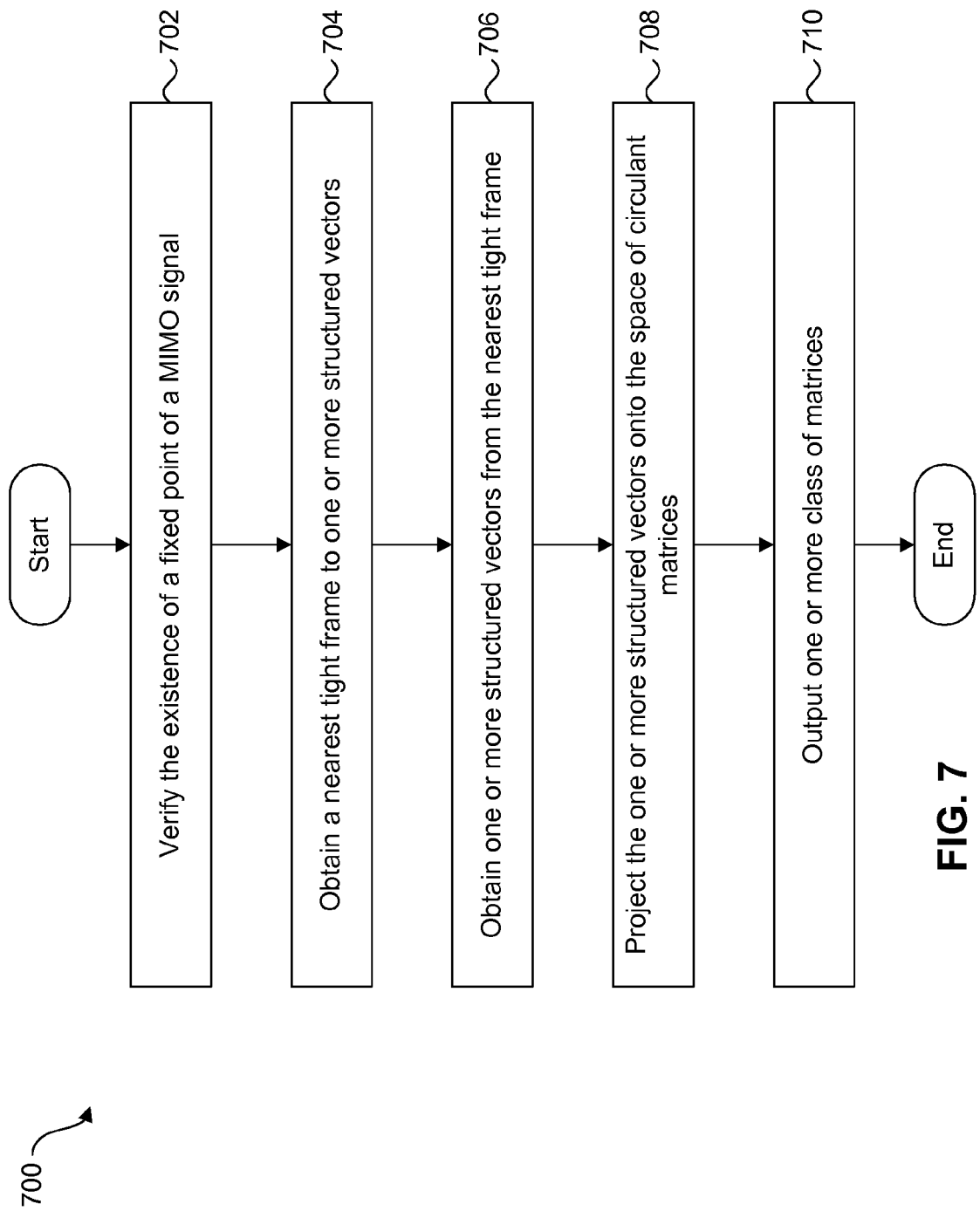
FIG. 7 is a flow diagram illustrating one embodiment of a method for designing a reference signal in a MIMO system.

FIG. 7 is a flow diagram illustrating one embodiment of a method 700 for designing a reference signal in a MIMO system. The method 700 may be implemented by the components discussed previously in regards to FIG. 6. In one embodiment, the existence of a fixed point of a MIMO signal is verified 702. For example, for a set of Zadoff-Chu sequences of lengths 19 or 37 (as previously described), the Zadoff-Chu sequences may be returned as used as an input to design the reference signal. A nearest tight frame to one or more structured vectors may be obtained 704. One or more structured vectors may then be obtained 706 from the previously computed nearest tight frame. The one or more structured vectors may be projected 708 onto the space of circulant matrices and one or more classes of matrices may be outputted 710. The outputted matrices may indicate the design of the reference signal transmitted in a MIMO system.

Figure 8:
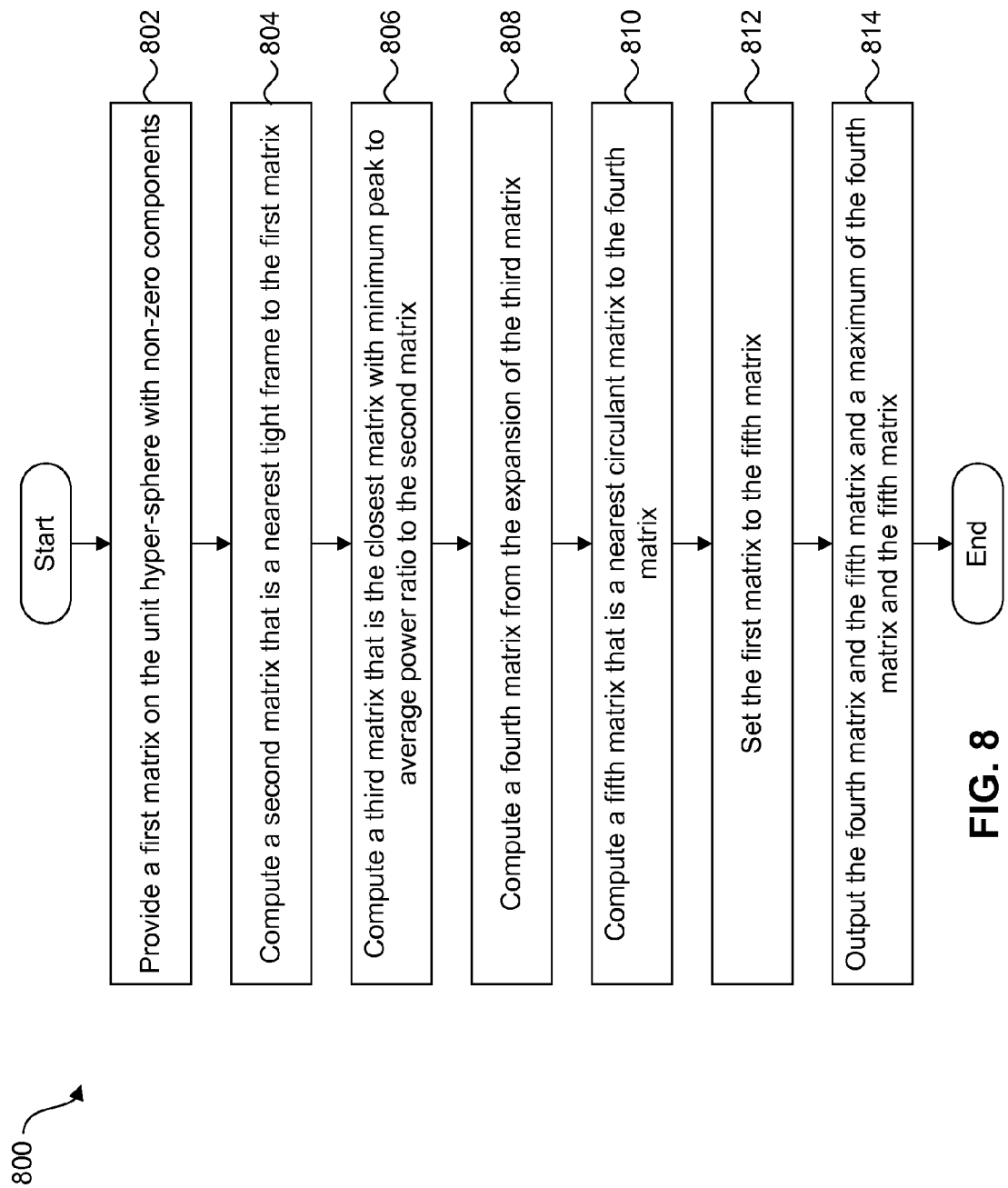
FIG. 8 is a flow diagram illustrating a further embodiment of an algorithm that may be utilized to design a reference signal.

FIG. 8 is a flow diagram 800 illustrating a further embodiment of an algorithm that may be utilized to design a reference signal. In one embodiment, a first matrix is provided 802. The first matrix may be on the unit hyper-sphere. Sequences may be on the unit hyper-sphere to ensure a satisfactory constant envelope property initially. The first matrix may include zero components if the starting sequence is on the unit hyper-sphere. A second matrix may be computed 804. The second matrix may be a nearest tight frame to the first matrix. The nearest tight frame may include an estimation of the first matrix.

In one embodiment, a third matrix may be computed 806. The third matrix may be the closest matrix with a minimum peak to average power ratio to the second matrix. The third matrix may also be expanded and a fourth matrix may be computed 808 from the expansion. In one embodiment, a fifth matrix is computed 810 that is a nearest circulant matrix to the fourth matrix. The first matrix may be set 812 to the fifth matrix. In other words, the first matrix may be assigned the included in the fifth matrix. The fourth matrix and the fifth matrix may be outputted 814. In addition, a maximum inner product of the fourth and fifth matrices may also be outputted 814.

The following may represent steps taken to compute a correlated set of matrices that is the closest matrix with a minimum peak to average power ratio. A sequence of N column vectors $\{x_n\}_{n=1}^{N}$, $x_n \in \mathcal{C}^d$, $d \leq N$, may be assigned as columns of a matrix $X = [x_1 \ x_2 \ \ldots \ x_N]$. The matrix may be referred to as a frame. Each vector may have unit length, without any loss in generality. Block of K of these vectors may be grouped into a set of matrices, $\{X_i\}_{i=1}^{K}$ so that (with MK=N) $X = [X_1 \ X_2 \ \ldots \ X_M]$. The correlation between vectors may be represented as $<x_k, x_n>$ which is the standard inner product in complex Euclidean d-space.

The Welch Bound is, for any frame, for $k \neq n$:

$$\max_{k \neq n} <x_k, x_n> \geq \sqrt{\frac{N-d}{d(N-1)}} \quad \text{(Equation 3)}$$

A frame that meets or approaches the Welch Bound may be referred to as a tight frame. The design considerations previously mentioned imply that for any $<x_k, x_n>$ not in the same $X_i$, $<x_k, x_n> \leq \alpha$, where $\alpha$ is a constant determined by the Welch Bound provided above. If any matrix $Z \in \mathbb{C}^{d \times N}$, is provided, the matrix that comes closest in distance (as measured in element-wise or Frobenius norm) may be given by $\alpha(Z Z^H)^{1/2} Z$. This condition may also enforce an orthnormality condition between rows of X, if an optimal X exists.

The design considerations previously mentioned also imply that $X_i^* X_i = I_K^*$; (with $K \leq d$). In other words, each column in any $X_i$ may be orthogonal to any other column in $X_i$. The above may be repeated with the role of X above being assumed by $X_i^H$. Further, if as few as two sequences are required per cell (i.e., per matrix $X_i$), a "phase parity check" may be implemented to provide orthogonality between column vectors in $X_i$ when there are zero entries in any column of $X_i$. In other words, the phase of the zero components are chosen such that orthogonality if maintained once each column vector has minimal Peak to Average Power Ratio.

The following may illustrate steps taken to obtain the circulant matrix nearest to a given matrix. A matrix $Z = [z_1 \ldots z_N]$, may be provided, where each $z_i$ is a column vector $\in \mathbb{C}^N$. A circulant matrix $C = [c_0 \ldots c_{N-1}]$, may be obtained that is closest in Frobenius (element-wise) norm to Z. In one embodiment, F may be given as the Discrete Fourier Transform (DFT) matrix:

$$F = \begin{bmatrix} 1 & 1 & \cdots & 1 \\ 1 & e^{-j2\pi/N} & \cdots & e^{-j2\pi(N-1)/N} \\ \vdots & \vdots & \ddots & \vdots \\ 1 & e^{-j2\pi(N-1)/N} & \cdots & e^{-j2\pi(N-1)(N-1)/N} \end{bmatrix} \quad \text{(Equation 4)}$$

A diagonal "delay" matrix D may be defined as $D = \text{diag}(1\ e^{-j2\pi/N}\ e^{-j2\pi 2/N} \ldots e^{-j2\pi(N-1)/N})$. For any ciculant matrix C, $C = F^H \Lambda F$, where $\Lambda$ is the DFT of the sequence/vector $c_0$. In addition, it may be shown that $c_{i+1 \bmod N} = F^H DF\ c_i = (F^H DF)^{(i+1) \bmod N} c_0$. Then $$\|Z - C\|_F^2 = \sum_{i=1}^{N} \|z_i - c_{i-1}\|^2$$

$$= \sum_{i=1}^{N} \|z_i - (F^H DF)^{(i-1)} c_0\|^2.$$

In one embodiment, $$\zeta = \begin{bmatrix} z_1 \\ z_2 \\ \vdots \\ z_N \end{bmatrix}, \text{ and } \mathcal{B} = \begin{bmatrix} I_N \\ F^H DF \\ \vdots \\ (F^H DF)^{N-1} \end{bmatrix}$$

to minimize $c_0$, which uniquely determines C, $c_0$ is given by $c_0 = \mathcal{B}^+ \zeta$, where $\mathcal{B}^+$ is the Moore-Penrose pseudo-inverse of $\mathcal{B}$. In other words, $\mathcal{B}^+ = \mathcal{B}^H \mathcal{B}^{-1} \mathcal{B}^H$.

Matrices where the number of column vectors are not equal to the number of row vectors may be referred to as reduced rank matrices (Z has fewer than N columns). Modifications may be implemented to the recurrence relation $c_{i+1 \bmod N} = F^H DF\ c_i$ and the forming of the appropriate matrix $\mathcal{B}$. If only two vectors were required that were cyclic shifted three elements apart, then $c_1 = (F^H DF)^3 c_0$ and $\mathcal{B}$ may include the matrix elements $I_N$ and $(F^H DF)^2$.

Figure 9:
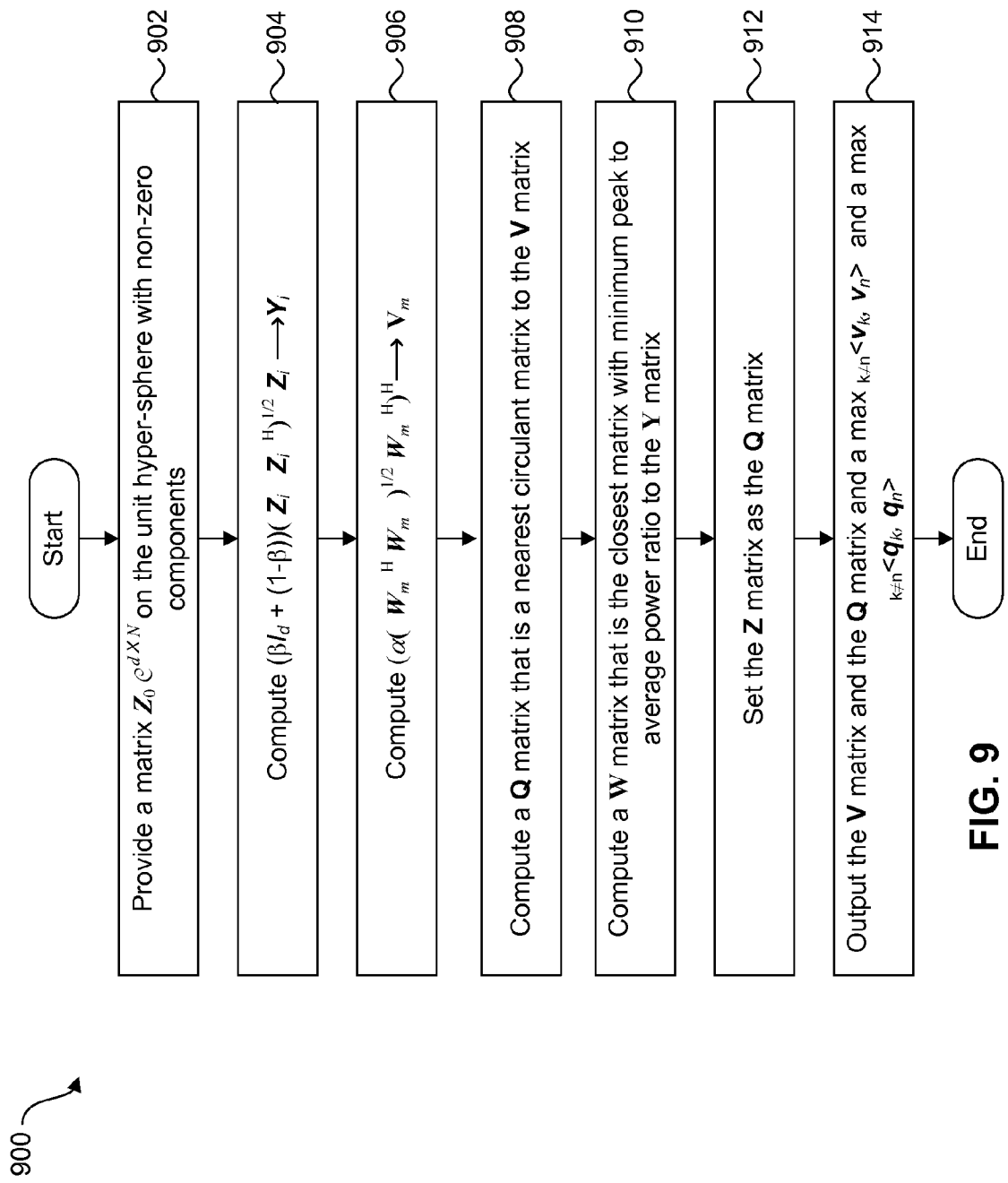
FIG. 9 is a flow diagram illustrating a method of an algorithm that may be utilized to design a reference signal in a MIMO system.

FIG. 9 is a flow diagram 900 illustrating a method of an algorithm that may be utilized to design a reference signal in a MIMO system. A matrix $Z_0 \in \mathbb{C}^{d \times N}$, may be provided 902. In one embodiment, the matrix $Z_0$ is on the unit hyper-sphere with all non-zero components. The following may occur for t=1 to T.

Orthogonal subsets for a plurality of sequences may also be created. Each subset of sequence may be replaced with matrix that is equal to $(\beta I_d + (1-\beta))(z_i z_i^H)^{1/2} z_i$. For example, $(\beta I_d + (1-\beta))(z_i z_i^H)^{1/2} z_i$ may be computed 904 and assigned to the matrix Y. This may result in the tight frame nearest to Z. The value d may represent the number of elements in a given sequence, $I_d$ may be a d×d identity matrix and $0 \leq \beta \leq 1$. In one embodiment, $\beta \approx 0.1$ may provide a satisfactory tradeoff between maximum correlation and orthogonality. The following constraints may be implemented. If zero entries exist in column vectors of Y, phases to their related components in Y may be added so that orthogonality is maintained. For m=1 to M, $(\alpha(W_m^H W_m)^{1/2} W_m^H)^H$ may be computed 906 and assigned to a vector $V_m$. The matrix $V = [V_1 V_2 \ldots V_M]$ may be assembled.

In one embodiment, the $\max_{k \neq n} <v_k, v_n>$ may be computed. Further, a Q matrix may be computed 908 that is a nearest circulant matrix to V and $\max_{k \neq n} <q_k, q_n>$ may also be computed. A W matrix may be computed 910. The W matrix may be the closest matrix with minimum PAPR to Y. The W matrix may be expressed as $W = [W_1 W_2 \ldots W_M]$. The Z matrix may be assigned 912 as the Q matrix. If a circulant matrix is not desired, the Z matrix may be assigned as the V matrix. In one embodiment, t is updated as t+1. The V matrix and the Q matrix may be outputted 914. In addition, $\max_{k \neq n} <v_k, v_n>$ and $\max_{k \neq n} <q_k, q_n>$ may also be outputted 914.

Figure 10:
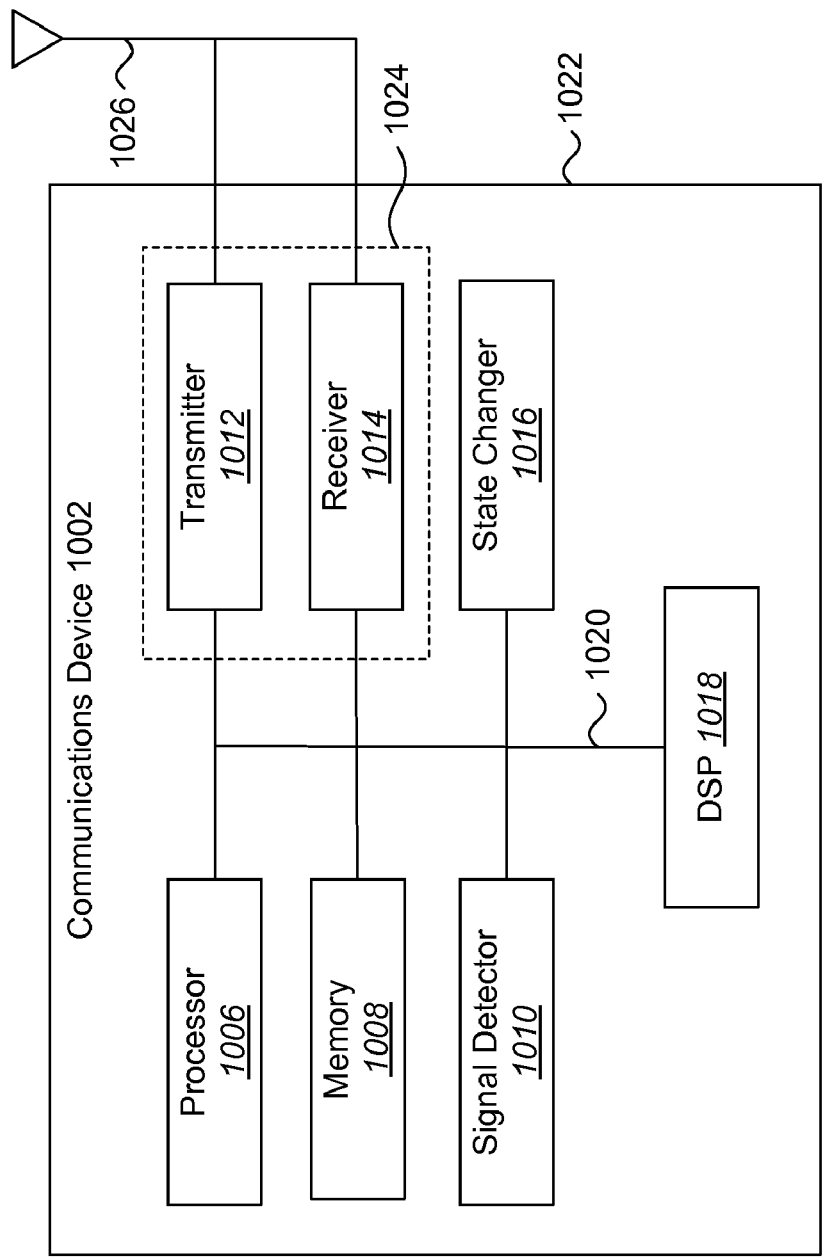
FIG. 10 illustrates various components that may be utilized in a communications device.

FIG. 10 illustrates various components that may be utilized in a communications device 1002. The communications device 1002 may include any type of communications device such as a mobile station, a cell phone, an access terminal, user equipment, a base station transceiver, a base station controller, etc. The communications device 1002 includes a processor 1006 which controls operation of the communications device 1002. The processor 1006 may also be referred to as a CPU. Memory 1008, which may include both read-only memory (ROM) and random access memory (RAM), provides instructions and data to the processor 1006. A portion of the memory 1008 may also include non-volatile random access memory (NVRAM).

The communications device 1002 may also include a housing 1022 that contains a transmitter 1012 and a receiver 1014 to allow transmission and reception of data. The transmitter 1012 and receiver 1014 may be combined into a transceiver 1024. An antenna 1026 is attached to the housing 1022 and electrically coupled to the transceiver 1024. Additional antennas (not shown) may also be used.

The communications device 1002 may also include a signal detector 1010 used to detect and quantify the level of signals received by the transceiver 1024. The signal detector 1010 detects such signals as total energy, pilot energy, power spectral density, and other signals.

A state changer 1016 controls the state of the communications device 1002 based on a current state and additional signals received by the transceiver 1024 and detected by the signal detector 1010. The communications device 1002 may be capable of operating in any one of a number of states.

The various components of the communications device 1002 are coupled together by a bus system 1020 which may include a power bus, a control signal bus, and a status signal bus in addition to a data bus. However, for the sake of clarity, the various buses are illustrated in FIG. 10 as the bus system 1020. The communications device 1002 may also include a digital signal processor (DSP) 1018 for use in processing signals. The communications device 1002 illustrated in FIG. 10 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for using a numerical method to design reference signals for multiple input multiple output (MIMO) systems, the method comprising:
   determining an input multiple input multiple output signal;
   obtaining a nearest tight frame to one or more given structured vectors, wherein each tight frame meets or approaches a Welch Bound;
   obtaining one or more structured vectors from the nearest tight frame;
   computing orthogonal subsets for a plurality of sequences, wherein each of the subsets is replaced with a matrix that comprises a function of one or more elements in each of the plurality of sequences and a product of an identity matrix associated with the one or more elements and a value, the value being greater than or equal to zero and less than or equal to one, wherein one less the value is added to the product;
   projecting the one or more structured vectors onto a space of circulant matrices; and
   outputting one or more classes of matrices associated with reference signals, wherein the method is performed by a communications device.

2. The method of claim 1, further comprising providing a set of reference signals to cover three sectors of a cell.

3. The method of claim 2, wherein at least two reference signals per sector are provided.

4. The method of claim 2, wherein the set of reference signals is orthogonal in each sector of a given cell.

5. The method of claim 2, wherein the set of reference signals is orthogonal in sectors adjacent to a given cell.

6. The method of claim 2, further comprising minimally correlating reference signals not in adjacent sectors.

7. The method of claim 2, wherein the set of reference signals comprise a Peak to Average Power Ratio that approximates a value of one.

8. The method of claim 1, wherein multiple bandwidths are employed simultaneously.

9. The method of claim 8, wherein a set of sequences are recursively generated from a base sequence.

10. The method of claim 1, further comprising providing a matrix on a unit hyper-sphere with non-zero components.

11. The method of claim 1, further comprising outputting the correlation between each of the one or more structured vectors.

12. The method of claim 1, further comprising projecting a sequence set to a nearest tight frame.

13. The method of claim 1, further comprising projecting subsets of a nearest tight frame to one or more orthogonal matrices.

14. The method of claim 1, further comprising projecting one or more orthogonal matrices to a nearest circulant matrix.

15. The method of claim 1, further comprising projecting each sequence onto a minimum Peak to Average Power Ratio vector.

16. The method of claim 1, wherein the matrix equals $(\beta I_d+(1-\beta))(x_i x_i^H)^{1/2} x_i$, wherein d comprises the number of elements in any given sequence, $I_d$ comprises a d×d identity matrix, $0 \leq \beta \leq 1$, $X_i$ comprises the one or more elements in each of the plurality of sequences and H denotes a conjugate transpose.

17. A transmitter that is configured to use a numerical method to design reference signals for multiple input multiple output (MIMO) systems, the transmitter comprising:
 a processor;
 memory in electronic communication with the processor;
 instructions stored in the memory, the instructions being executable to:
  determine an input multiple input multiple output signal;
  obtain a nearest tight frame to one or more given structured vectors, wherein each tight frame meets or approaches a Welch Bound;
  obtain one or more structured vectors from the nearest tight frame;
  compute orthogonal subsets for a plurality of sequences, wherein each of the subsets is replaced with a matrix that comprises a function of one or more elements in each of the plurality of sequences and a product of an identity matrix associated with the one or more elements and a value, the value being greater than or equal to zero and less than or equal to one, wherein one less the value is added to the product;
  project the one or more structured vectors onto a space of circulant matrices; and
  output one or more classes of matrices associated with reference signals.

18. The transmitter of claim 17, wherein the instructions are further executable to provide a matrix on a unit hypersphere with non-zero components.

19. The transmitter of claim 17, wherein the instructions are further executable to output the correlation between each of the one or more structured vectors.

20. The transmitter of claim 17, wherein the instructions are further executable to provide a set of reference signals to cover three sectors of a cell.

21. The transmitter of claim 20, wherein at least two reference signals per sector are provided.

22. The transmitter of claim 20, wherein the set of reference signals is orthogonal in each sector of a given cell.

23. The transmitter of claim 20, wherein the set of reference signals is orthogonal in sectors adjacent to a given cell.

24. The transmitter of claim 20, wherein the instructions are further executable to minimally correlate reference signals not in adjacent sectors.

25. A non-transitory computer-readable medium comprising executable instructions for using a numerical method to design reference signals for multiple input multiple output (MIMO) systems, the instructions being executable to:
 determine an input multiple input multiple output signal;
 obtain a nearest tight frame to one or more given structured vectors, wherein each tight frame meets or approaches a Welch Bound;
 obtain one or more structured vectors from the nearest tight frame;
 compute orthogonal subsets for a plurality of sequences, wherein each of the subsets is replaced with a matrix that comprises a function of one or more elements in each of the plurality of sequences and a product of an identity matrix associated with the one or more elements and a value, the value being greater than or equal to zero and less than or equal to one, wherein one less the value is added to the product;
 project the one or more structured vectors onto a space of circulant matrices; and
 output one or more classes of matrices associated with reference signals.

* * * * *